US010945170B2

(12) United States Patent
Chen et al.

(10) Patent No.: US 10,945,170 B2
(45) Date of Patent: Mar. 9, 2021

(54) COMMUNICATION METHOD AND MOBILE TERMINAL

(71) Applicant: Huawei Technologies Co., Ltd., Shenzhen (CN)

(72) Inventors: Minghui Chen, Xi'an (CN); Fei Luo, Xi'an (CN); Junhua Shen, Shanghai (CN); Ning Zhao, Beijing (CN); Yingjun Guan, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 35 days.

(21) Appl. No.: 16/339,650

(22) PCT Filed: Dec. 29, 2016

(86) PCT No.: PCT/CN2016/113142
§ 371 (c)(1),
(2) Date: Apr. 4, 2019

(87) PCT Pub. No.: WO2018/119923
PCT Pub. Date: Jul. 5, 2018

(65) Prior Publication Data
US 2019/0364470 A1 Nov. 28, 2019

(51) Int. Cl.
*G01R 31/08* (2020.01)
*G06F 11/00* (2006.01)
(Continued)

(52) U.S. Cl.
CPC ... *H04W 36/0088* (2013.01); *H04W 36/0058* (2018.08); *H04W 36/14* (2013.01); *H04W 84/042* (2013.01)

(58) Field of Classification Search
CPC ......... H04W 36/0088; H04W 36/0058; H04W 36/14; H04W 84/02; H04W 36/0066;
(Continued)

(56) References Cited

U.S. PATENT DOCUMENTS

| 7,936,694 B2 * | 5/2011 | Choudhury | H04L 29/06027 370/252 |
| 8,055,201 B1 * | 11/2011 | Kuan | H04M 1/72519 455/67.11 |

(Continued)

FOREIGN PATENT DOCUMENTS

| CN | 101087478 A | 12/2007 |
| CN | 101835223 A | 9/2010 |

(Continued)

OTHER PUBLICATIONS

Foreign Communication From a Counterpart Application, PCT Application PCT/CN2016/113142, English Translation of International Search Report dated Aug. 30, 2017, 2 pages.

*Primary Examiner* — Stephen M D Agosta
(74) *Attorney, Agent, or Firm* — Conley Rose, P.C.

(57) ABSTRACT

A communication method for a mobile terminal and a mobile terminal, where the communication method includes detecting whether the mobile terminal uses a call service, obtaining a state of an access control circuit when the mobile terminal uses the call service, and selecting a process of network quality monitoring based on the obtained state of the access control circuit, where the process of network quality monitoring includes stopping network quality monitoring, or stopping reporting a network quality monitoring result to a network side. Hence, the network side can process the call service of the mobile terminal based on the process of network quality monitoring performed by the mobile terminal to avoid a before-ringing inter-system handover and improve user experience.

20 Claims, 3 Drawing Sheets

(51) Int. Cl.
*G08C 15/00* (2006.01)
*H04J 1/16* (2006.01)
*H04J 3/14* (2006.01)
*H04L 1/00* (2006.01)
*H04L 12/26* (2006.01)
*H04W 36/00* (2009.01)
*H04W 36/14* (2009.01)
*H04W 84/04* (2009.01)

(58) Field of Classification Search
CPC ....... H04W 36/38; H04W 4/16; H04W 76/16; H04W 76/02; H04W 76/10; H04L 65/1016; H04L 65/1069; H04L 65/1096; H04M 2207/187; H04M 7/006
See application file for complete search history.

(56) References Cited

U.S. PATENT DOCUMENTS

| | | | | |
|---|---|---|---|---|
| 2008/0165698 A1* | 7/2008 | Dalsgaard | ............. | H04W 24/10 370/252 |
| 2008/0261530 A1* | 10/2008 | Gerstenberger | .. | H04W 52/0219 455/63.1 |
| 2008/0305800 A1* | 12/2008 | Sharp | ................ | H04W 36/0066 455/438 |
| 2011/0034159 A1* | 2/2011 | Philmon | ........... | H04M 3/42025 455/418 |
| 2012/0063420 A1 | 3/2012 | Long et al. | | |
| 2013/0040683 A1* | 2/2013 | Siomina | ............ | H04W 28/0236 455/517 |
| 2013/0084893 A1* | 4/2013 | Saito | ..................... | H04W 24/10 455/458 |
| 2013/0331137 A1* | 12/2013 | Burchill | ............. | H04W 52/243 455/501 |
| 2014/0090047 A1* | 3/2014 | Yuan | ................... | H04L 63/0263 726/13 |
| 2014/0133455 A1 | 5/2014 | Hallenstal et al. | | |
| 2014/0248897 A1* | 9/2014 | Sfar | ...................... | H04L 47/824 455/453 |
| 2015/0207827 A1* | 7/2015 | Jheng | .................. | H04L 65/1046 370/260 |
| 2015/0223130 A1 | 8/2015 | Tanaka et al. | | |
| 2015/0229758 A1 | 8/2015 | Tanaka et al. | | |
| 2015/0351140 A1* | 12/2015 | Sonnevi | ................ | H04W 8/082 370/329 |
| 2016/0119942 A1* | 4/2016 | Wang | ................ | H04W 72/1215 370/336 |
| 2016/0323809 A1* | 11/2016 | Zhang | ............... | H04W 36/0083 |
| 2016/0323873 A1* | 11/2016 | Takeda | .................... | H04L 5/001 |
| 2017/0026426 A1 | 1/2017 | Chong et al. | | |
| 2017/0230872 A1 | 8/2017 | Ma | | |

FOREIGN PATENT DOCUMENTS

| | | |
|---|---|---|
| CN | 104272703 A | 1/2015 |
| CN | 104604210 A | 5/2015 |
| CN | 104604326 A | 5/2015 |
| CN | 104754677 A | 7/2015 |
| CN | 104994542 A | 10/2015 |
| CN | 105557020 A | 5/2016 |
| WO | 2014124659 A1 | 8/2014 |
| WO | 2015184704 A1 | 12/2015 |
| WO | 2016200660 A1 | 12/2016 |

* cited by examiner

COMMUNICATION METHOD AND MOBILE TERMINAL

CROSS-REFERENCE TO RELATED APPLICATIONS

This application is a U.S. National Stage of International Patent Application No. PCT/CN2016/113142 filed Dec. 29, 2016, which is hereby incorporated by reference in its entirety.

TECHNICAL FIELD

The present invention relates to the communications field, and in particular, to a VoLTE (Voice over LTE (Long Term Evolution, Long Term Evolution), voice over LTE) technology.

BACKGROUND 4G (the 4th Generation mobile communication technology, the 4th generation mobile communication technology) not only provides high-speed data services, but also provides high-quality audio and video calls. The high-quality audio and video calls are implemented by using a VoLTE (Voice over LTE (Long Term Evolution, Long Term Evolution), voice over LTE) technology. In actual use, it is possible that a mobile terminal moves between a 4G network and a 2G (the 2nd Generation mobile communication technology, the 2nd generation mobile communication technology)/3G (the 3rd Generation mobile communication technology, the 3rd generation mobile communication technology) CS (Circuit Switching, circuit switched) network. Therefore, to ensure continuity of a voice call, 3GPP (3rd Generation Partnership Project, 3rd Generation Partnership Project) proposed a VoLTE voice service continuity solution, that is, SRVCC (Single Radio Voice Call Continuity, single radio voice call continuity). This ensures that a single radio frequency UE performs smooth switching between IMS-controlled VoIP voice and CS-domain voice. There are generally three SRVCC cases corresponding to three call setup states: bSRVCC (Before alerting Single Radio Voice Call Continuity, single radio voice call continuity before ringing), aSRVCC (Alerting Single Radio Voice Call Continuity, single radio voice call continuity in alerting phase), and eSRVCC (Enhanced Single Radio Voice Call Continuity, enhanced single radio voice call continuity). Because bSRVCC occurs before ringing and a user terminal is always at a resource negotiation and query stage, a relatively large quantity of network elements are involved, and a collision is likely to occur between the network elements. This results in a call failure and poor user experience. In the prior art, if LTE network signal quality is relatively poor before a voice call is set up, the voice call is directly carried on the CS domain, to reduce an occurrence probability of bSRVCC. However, according to the foregoing solution, a probability of bSRVCC is reduced only for a calling party, and a probability of bSRVCC for a called party is not reduced. For the called party, if bSRVCC switching fails, "ghost rings" occur, or constant ringing is produced, or no sound is heard, affecting user experience.

SUMMARY

Embodiments of the present invention describe a communication method and an apparatus, to effectively avoid a before-alerting inter-system handover, and avoid bad user experience caused by an inter-system handover failure.

According to one aspect, an embodiment of the present invention provides a communication method. The method includes: detecting whether a mobile terminal is using a call service; obtaining a state of an access control module if the mobile terminal is using the call service; and determining processing of network quality monitoring based on the obtained state of the access control module, where the processing of network quality monitoring includes stopping network quality monitoring, or stopping reporting a network quality monitoring result to a network side. Therefore, the network side can process the call service of the mobile terminal based on the processing of network quality monitoring.

In a possible case, the stopping network quality monitoring includes: stopping network quality monitoring if the access control module is in an initialized state for call service setup. If network quality monitoring stops, the network side does not receive a quality measurement report from the terminal, so that the network side does not perform an inter-system handover, thereby avoiding a call service setup failure.

In a possible case, the stopping reporting a network quality monitoring result to a network side includes: stopping reporting the network quality monitoring result to the network side if the access control module is in an initialized state. If reporting the network quality monitoring result to the network side stops, the network side does not perform an inter-system handover, thereby avoiding a call service setup failure.

In a possible case, the stopping reporting a network quality monitoring result to a network side includes: stopping reporting, to the network side, a report that a 2G/3G network signal strength is higher than a first threshold. If the network side does not receive the report that the 2G/3G network signal strength is higher than the first threshold, no inter-system handover is performed, thereby avoiding a call service setup failure.

In a possible case, the stopping reporting, by the terminal, a network quality monitoring result to a network side includes: stopping reporting, to the network side, a report that a 2G/3G network signal strength is higher than a second threshold and a 4G network signal strength is lower than a third threshold. If the network side does not receive the report that the 2G/3G network signal strength is higher than the second threshold and the 4G network signal strength is lower than the third threshold, no inter-system handover is performed, thereby avoiding a call service setup failure.

According to another aspect, an embodiment of the present invention provides a mobile terminal. The mobile terminal includes: a detection unit, configured to detect whether the mobile terminal is using a call service; an obtaining unit, configured to obtain a state of an access control module if the mobile terminal is using the call service; and a processing unit, configured to determine processing of network quality monitoring based on the obtained state of the access control module, where the processing of network quality monitoring includes stopping network quality monitoring, or stopping reporting a network quality monitoring result to a network side. Therefore, the network side can process the call service of the mobile terminal based on the processing of network quality monitoring performed by the mobile terminal.

In a possible design, the processing unit stops network quality monitoring if the access control module is in an initialized state. If network quality monitoring stops, the network side does not receive a network quality measurement report, so that the network side does not perform an inter-system handover, thereby avoiding a call service setup failure.

In a possible design, the processing unit stops reporting network quality monitoring result to the network side if the access control module is in an initialized state. If the network side does not receive a network quality measurement report, the network side does not perform an inter-system handover, thereby avoiding an inter-system handover failure.

In a possible design, the mobile terminal stops reporting, to the network side, a report that a 2G/3G network signal strength is higher than a first threshold. If the network side does not receive the report that the 2G/3G network signal strength is higher than the first threshold, no inter-system handover is performed, thereby avoiding an inter-system handover failure.

In a possible design, the mobile terminal stops reporting, to the network side, a report that a 2G/3G network signal strength is higher than a second threshold and a 4G network signal strength is lower than a third threshold. If the network side does not receive the report that the 2G/3G network signal strength is higher than the second threshold and the 4G network signal strength is lower than the third threshold, no inter-system handover is performed, thereby avoiding an inter-system handover failure.

According to another aspect, an embodiment of the present invention provides a mobile terminal. The mobile terminal includes: a baseband chip, configured to detect whether the mobile terminal is using a call service; a radio resource module, configured to obtain a state of an access control module if the mobile terminal is using the call service; and a processor, configured to determine processing of network quality monitoring based on the obtained state of the access control module, where the processing of network quality monitoring includes stopping network quality monitoring, or stopping reporting a network quality monitoring result to a network side. Therefore, the network side can process the call service of the mobile terminal based on the processing of network quality monitoring performed by the mobile terminal.

In a possible design, the processor stops network quality monitoring if the access control module is in an initialized state. If network quality monitoring stops, the network side does not receive a network quality measurement report, so that the network side does not perform an inter-system handover, thereby avoiding an inter-system handover failure.

In a possible design, the processor stops reporting the network quality monitoring result to the network side if the access control module is in an initialized state. If the network side does not receive a network quality measurement report, the network side does not perform an inter-system handover, thereby avoiding an inter-system handover failure.

In a possible design, the mobile terminal stops reporting, to the network side, a report that a 2G/3G network signal strength is higher than a first threshold. If the network side does not receive the report that the 2G/3G network signal strength is higher than the first threshold, no inter-system handover is performed, thereby avoiding an inter-system handover failure.

In a possible design, the mobile terminal stops reporting, to the network side, a report that a 2G/3G network signal strength is higher than a second threshold and a 4G network signal strength is lower than a third threshold. If the network side does not receive the report that the 2G/3G network signal strength is higher than the second threshold and the 4G network signal strength is lower than the third threshold, no inter-system handover is performed, thereby avoiding an inter-system handover failure.

It can be learned from the foregoing solutions that according to the method and the mobile terminal provided by the embodiments of the present invention, when the mobile terminal initiates a call or receives an incoming call, an IMSA state is monitored, so that in a before-alerting state subject to an inter-system handover failure, network quality measurement is stopped, or triggering reporting of the network quality measurement report is stopped, to avoid bSRVCC. In this way, no inter-system handover is performed for the mobile terminal before ringing, thereby avoiding a handover failure and further avoiding an abnormal terminal call caused by the handover failure, and improving user experience.

BRIEF DESCRIPTION OF DRAWINGS

To describe the technical solutions in the embodiments of the present invention or in the prior art more clearly, the following briefly describes the accompanying drawings required for describing the embodiments or the prior art. Apparently, the accompanying drawings in the following description show some embodiments of the present invention, and persons of ordinary skill in the art may still derive other drawings from these accompanying drawings without creative efforts.

DESCRIPTION OF EMBODIMENTS

To make the objectives, technical solutions, and advantages of the embodiments of the present invention clearer, the following describes the technical solutions in the embodiments of the present invention with reference to the accompanying drawings in the embodiments of the present invention. Apparently, the described embodiments are a part rather than all of the embodiments of the present invention. All other embodiments obtained by persons of ordinary skill in the art based on the embodiments of the present invention without creative efforts shall fall within the protection scope of the present invention.

During a call process of a VoLTE mobile terminal, due to network coverage, when the VoLTE mobile terminal is in a call, a base station eNodeB in LTE delivers network quality measurement control. After the mobile terminal receives the network quality measurement control delivered by the eNodeB, a GSM (Global System for Mobile Communication, global system for mobile communications) physical layer of the mobile terminal performs network quality measurement, and a radio resource control module of the mobile terminal reports an obtained measurement result to a network side. When a 2G/3G signal strength is higher than a specific threshold (for example, the threshold is set to 10 db to 15 db by the eNodeB), the radio resource control module reports a B1 measurement report; when a 2G/3G signal strength is higher than a specific threshold (for example, the threshold is set to 10 db to 15 db by the eNodeB) and a 4G signal strength is lower than a specific threshold (for example, the threshold is set to 24 db to 28 db by the eNodeB), the radio resource control module reports a B2 measurement report. The network side determines, based on the B1 measurement report or the B2 measurement report, whether to perform an inter-system handover. In other words, the network side determines, based on the B1 measurement report or the B2 measurement report, whether to hand over the call of the VoLTE mobile terminal from a 4G network bearer to a 2G/3G network bearer. The "being in a call" includes a case in which the mobile terminal has been connected to a peer end, a case in which the mobile terminal initiates a call but has not been connected to the peer end, and a case in which the mobile terminal receives an incoming call but the incoming call has not been connected. In other words, before-ringing, ringing, and call setup all belong to states of "being in a call".

Figure 1:
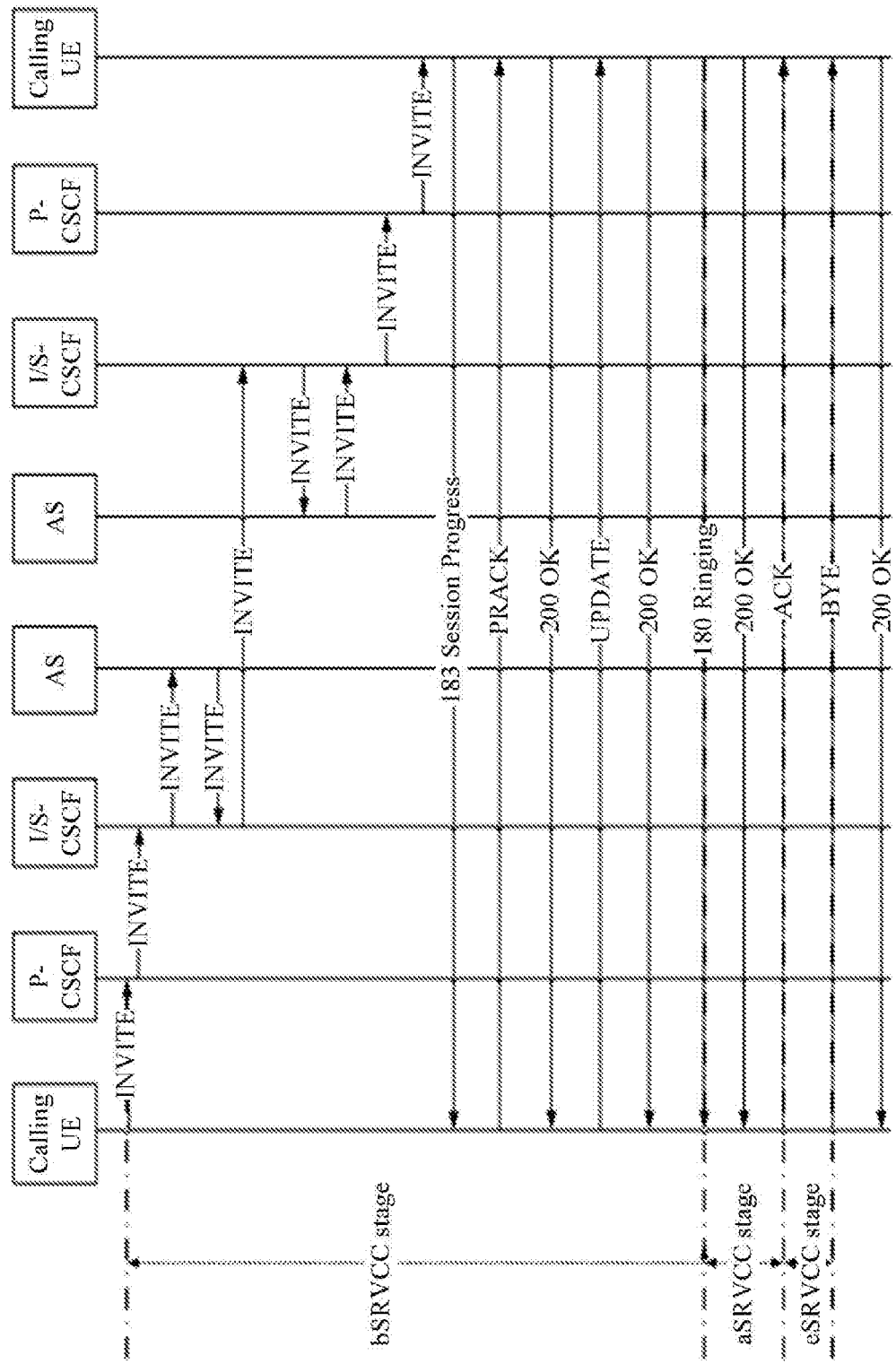
FIG. 1 is a flowchart of initiating a call in VoLTE.

FIG. 1 is a flowchart of initiating a call by a VoLTE mobile terminal. It can be learned from the figure that when the VoLTE mobile terminal initiates a call, before ringing, the mobile terminal is in a resource negotiation and query phase, a relatively large quantity of network elements, procedures, and signaling are involved. In this case, if a network side determines, based on the B1 measurement report or the B2 measurement report, to hand over the call of the mobile terminal from a VoLTE network bearer to a 2G/3G network bearer, a collision between the network elements is likely to occur. For example, the call of the terminal is abnormal due to a process collision during handover from a 4G network to a 2G/3G network. For example, "ghost rings" occur, or constant ringing is produced, or no sound is heard, which affects user experience.

Figure 2:
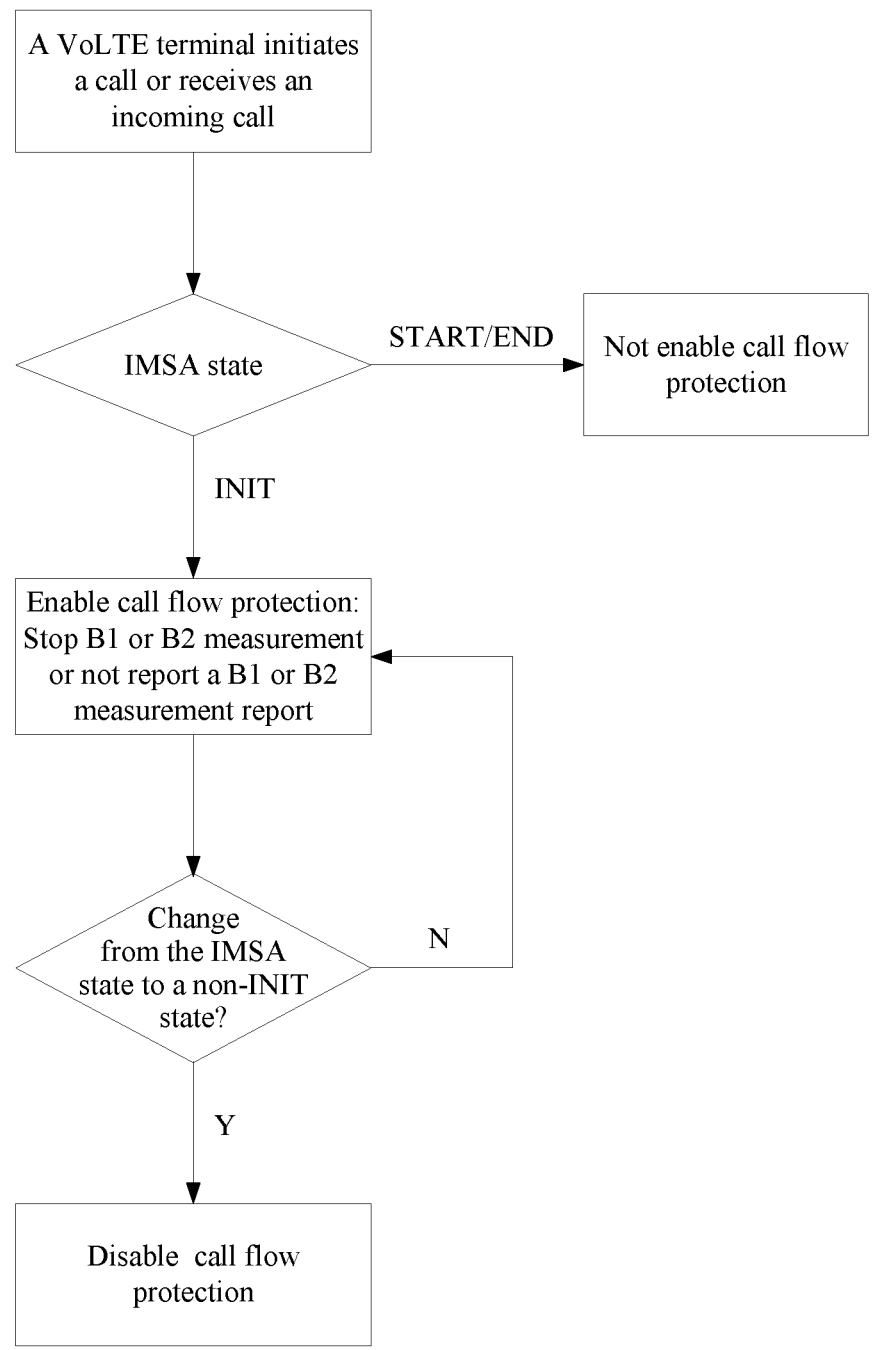
FIG. 2 is a flowchart of communication of a VoLTE mobile terminal according to an embodiment of the present invention.

To resolve the foregoing problem, an embodiment of the present invention provides a communication method. As shown in FIG. 2, when a mobile terminal initiates a call or receives an incoming call, the mobile terminal monitors a state of an access control module. In one embodiment, monitoring is completed by a radio resource control module, such as RRC (Radio Resource Control, radio resource control). In one embodiment, the access control module is an access control module of an IP multimedia subsystem. If it is detected that a state of the access control module is an INIT initialized state, namely, a before-ringing state, call flow protection is enabled. Call flow protection may be stopping measurement on network quality. In one embodiment, the network quality is a network signal strength. Call flow protection may be stopping triggering reporting of a network quality report. In one embodiment, the stopping triggering reporting of a network quality report includes stopping triggering reporting of a B1 measurement report or a B2 measurement report. In specific implementation, stopping triggering reporting of a specific measurement report is determined according to settings of different operators. When call flow protection is enabled, a service of a call or an incoming call is directly carried in the system, so as to ensure integrity of a protocol flow in the system, and avoid a before-ringing inter-system handover.

When the state of the access control module is changed, for example, the state of the access control module is changed into a START state, namely, a start state, and the terminal is ringing at that time, call flow protection is disabled, to perform network quality measurement and report the network quality report to a network side. In one of the embodiments, the network quality report is the B1 measurement report or the B2 measurement report. When the mobile terminal has an SRVCC request, SRVCC is performed.

When the state of the access control module is an END state, that is, an access flow is completed and a communication path has been established between both parties in the call at that time, call flow protection is not to be enabled. If call flow protection has been enabled, call flow protection is disabled, to perform network quality measurement and report the B1 measurement report or the B2 measurement report to the network side. When the mobile terminal has an SRVCC request, SRVCC is performed.

According to the foregoing embodiment of the present invention, when the mobile terminal initiates a call or receives an incoming call, an IMSA state is monitored, so that in a before-ringing state subject to an inter-system handover failure, network quality measurement is stopped, or triggering reporting of the network quality measurement report is stopped, to avoid bSRVCC. In this way, no inter-system handover is performed for the mobile terminal before ringing, thereby avoiding a handover failure and further avoiding an abnormal terminal call caused by the handover failure, and improving user experience.

Figure 3:
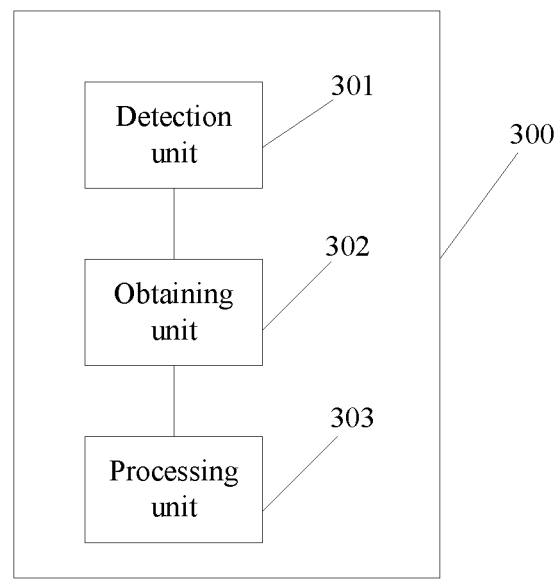
FIG. 3 shows a mobile terminal according to an embodiment of the present invention.

As shown in FIG. 3, an embodiment of the present invention further provides a mobile terminal 300. The mobile terminal 300 includes a detection unit 301, an obtaining unit 302, and a processing unit 303. When the mobile terminal initiates a call or receives an incoming call, the detection unit 301 detects that the mobile terminal is using a call service, and the obtaining unit 302 monitors a state of an access control module of the mobile terminal. In one embodiment, the obtaining unit 302 is a radio resource control module. In one embodiment, the access control module is an access control module of an IP multimedia subsystem. If the obtaining unit 302 detects that the state of the access control module is an INIT initialized state, namely, a before-ringing state, the processing unit 303 enables call flow protection. Call flow protection may be stopping measurement on network quality. In one embodiment, the network quality is a network signal strength. Call flow protection may be stopping triggering reporting of a network quality report. In one embodiment, the stopping triggering reporting of a network quality report includes stopping triggering reporting of a B1 measurement report or a B2 measurement report. In specific implementation, stopping triggering reporting of a specific measurement report is determined according to settings of different operators. When call flow protection is enabled, a service of a call or an incoming call is directly carried in the system, so as to ensure integrity of a protocol flow in the system, and avoid a before-ringing inter-system handover.

When the obtaining unit 302 detects that the state of the access control module is changed, for example, the state of the access control module is changed into a START state, namely, a start state, and the terminal is ringing at that time, the processing unit 303 disables call flow protection, to perform network quality measurement and report the network quality report to a network side. In one of the embodiments, the network quality report is the B1 measurement report or the B2 measurement report. When the mobile terminal has an SRVCC request, SRVCC is performed.

When the obtaining unit 302 detects that the state of the access control module is an END state, that is, an access flow is completed and a communication path has been established between both parties in the call at that time, the processing unit 303 does not enable call flow protection. If call flow protection has been enabled, the processing unit 303 disables call flow protection, to perform network quality measurement and report the B1 measurement report or the B2 measurement report to the network side. When the mobile terminal has an SRVCC request, SRVCC is performed.

According to the foregoing embodiment of the present invention, when the mobile terminal initiates a call or receives an incoming call, an IMSA state is monitored, so that in a before-ringing state subject to an inter-system handover failure, network quality measurement is stopped, or triggering reporting of the network quality measurement report is stopped, to avoid bSRVCC. In this way, no inter-system handover is performed for the mobile terminal before ringing, thereby avoiding a handover failure and further avoiding an abnormal terminal call caused by the handover failure, and improving user experience.

Figure 4:
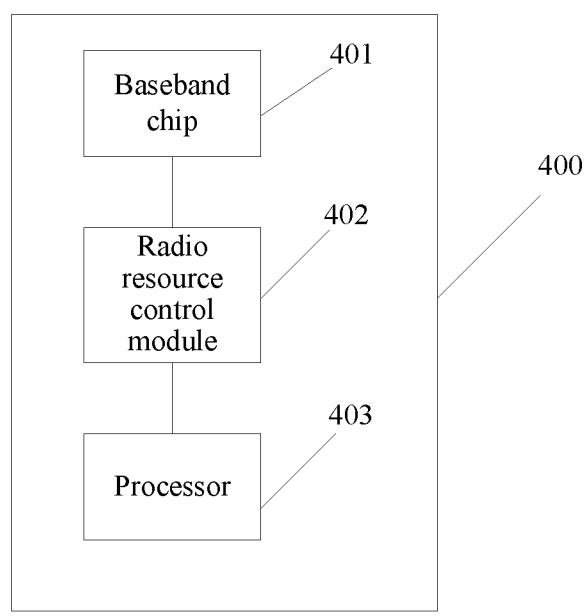
FIG. 4 shows another mobile terminal according to an embodiment of the present invention.

FIG. 4 shows a mobile terminal 400 provided in an embodiment of the present invention. The mobile terminal 400 includes a baseband chip 401, a radio resource module 402, and a processor 403. The baseband chip 401 of the mobile terminal in this embodiment may be an independent baseband chip or a baseband chip including a radio-frequency chip. When the mobile terminal initiates a call or receives an incoming call, the baseband chip 401 detects that the mobile terminal is using a call service, and the radio resource module 402 monitors a state of an access control module of the mobile terminal. In one embodiment, the radio resource module 402 is a radio resource control module. In one embodiment, the access control module is an access control module of an IP multimedia subsystem. If the radio resource module 402 detects that the state of the access control module is an INIT initialized state, namely, a before-ringing state, the processor 403 enables call flow protection. Call flow protection may be stopping measurement on network quality. In one embodiment, the network quality is a network signal strength. Call flow protection may be stopping triggering reporting of a network quality report. In one embodiment, the stopping triggering reporting of a network quality report includes stopping triggering reporting of a B1 measurement report or a B2 measurement report. In specific implementation, stopping triggering reporting of a specific measurement report is determined according to settings of different operators. When call flow protection is enabled, a service of a call or an incoming call is directly carried in the system, so as to ensure integrity of a protocol flow in the system, and avoid a before-ringing inter-system handover.

When the radio resource module 402 detects that the state of the access control module is changed, for example, the state of the access control module is changed into a START state, namely, a start state, and the terminal is ringing at that time, the processor 403 disables call flow protection, to perform network quality measurement and report the network quality report to a network side. In one of the embodiments, the network quality report is the B1 measurement report or the B2 measurement report. When the mobile terminal has an SRVCC request, SRVCC is performed.

When the radio resource module 402 detects that the state of the access control module is an END state, that is, an access flow is completed and a communication path has been established between both parties in the call at that time, the processor 403 does not enable call flow protection. If call flow protection has been enabled, the processor 403 disables call flow protection, to perform network quality measurement and report the B1 measurement report or the B2 measurement report to the network side. When the mobile terminal has an SRVCC request, SRVCC is performed.

According to the foregoing embodiment of the present invention, when the mobile terminal initiates a call or receives an incoming call, an IMSA state is monitored, so that in a before-ringing state subject to an inter-system handover failure, network quality measurement is stopped, or triggering reporting of the network quality measurement report is stopped, to avoid bSRVCC. In this way, no inter-system handover is performed for the mobile terminal before ringing, thereby avoiding a handover failure and further avoiding an abnormal terminal call caused by the handover failure, and improving user experience.

According to the solutions provided by the embodiments of the present invention, persons skilled in the art can make various modifications and variations to the present invention without departing from the spirit and scope of the present invention. The present invention is intended to cover these modifications and variations provided that they fall within the scope of protection defined by the following claims and their equivalent technologies.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A communication method for a mobile terminal, comprising:
    detecting whether the mobile terminal uses a call service;
    obtaining a state of an access control circuit when the mobile terminal uses the call service; and
    selecting a process of network quality monitoring based on the state of the access control circuit, wherein the process of the network quality monitoring comprises either:
        stop reporting, to a network side, a first report indicating that a second generation mobile communication technology (2G)/third generation mobile communication technology (3G) network signal strength is higher than a first threshold; or
        stop reporting, to the network side, a second report indicating the 2G/3G network signal strength is higher than a second threshold and a fourth generation mobile communication technology (4G) network signal strength is lower than a third threshold.

2. The communication method of claim 1, wherein the first threshold comprises 10 decibels (db) to 15 db, wherein the second threshold comprises 10 db to 15 db, and wherein the third threshold is 24 db to 28 db.

3. The communication method of claim 1, wherein the first report comprises a B1 measurement report, and wherein the second report comprises a B2 measurement report.

4. The communication method of claim 1, wherein the mobile terminal comprises a Voice over Long Term Evolution (VoLTE) mobile terminal.

5. The communication method of claim 1, wherein the access control circuit comprises an access control module of an Internet Protocol (IP) multimedia subsystem.

6. The communication method of claim 1, wherein the mobile terminal uses the call service by initiating a call.

7. The communication method of claim 1, wherein the mobile terminal uses the call service by receiving an incoming call.

8. A mobile terminal, comprising:
a memory comprising instructions; and
a processor coupled to the memory, wherein the instructions cause the processor to be configured to:
detect whether the mobile terminal uses a call service;
obtain a state of an access control circuit when the mobile terminal uses the call service; and
select a process of network quality monitoring based on the state of the access control circuit, wherein the process of the network quality monitoring comprises either:
stop reporting, to a network side, a first report indicating that a second generation mobile communication technology (2G)/third generation mobile communication technology (3G) network signal strength is higher than a first threshold; or
stop reporting, to the network side, a second report indicating the 2G/3G network signal strength is higher than a second threshold and a fourth generation mobile communication technology (4G) network signal strength is lower than a third threshold.

9. The mobile terminal of claim 8, wherein the first threshold comprises 10 decibels (db) to 15 db, wherein the second threshold comprises 10 db to 15 db, and wherein the third threshold is 24 db to 28 db.

10. The mobile terminal of claim 8, wherein the first report comprises a B1 measurement report, and wherein the second report comprises a B2 measurement report.

11. The mobile terminal of claim 8, wherein the mobile terminal comprises a Voice over Long Term Evolution (VoLTE) mobile terminal.

12. The mobile terminal of claim 8, wherein the access control circuit comprises an access control module of an Internet Protocol (IP) multimedia subsystem.

13. The mobile terminal of claim 8, wherein the mobile terminal uses the call service by initiating a call.

14. The mobile terminal of claim 8, wherein the mobile terminal uses the call service by receiving an incoming call.

15. A mobile terminal, comprising:
a baseband chip configured to detect whether the mobile terminal uses a call service;
a radio resource circuit coupled to the baseband chip and configured to obtain a state of an access control circuit when the mobile terminal uses the call service; and
a processor coupled to the baseband chip and the radio resource circuit and configured to select a process of network quality monitoring based on the state of the access control circuit, wherein the process of the network quality monitoring comprises either:
stop reporting, to a network side, a first report indicating that a second generation mobile communication technology (2G)/third generation mobile communication technology (3G) network signal strength is higher than a first threshold; or
stop reporting, to the network side, a second report indicating the 2G/3G network signal strength is higher than a second threshold and a fourth generation mobile communication technology (4G) network signal strength is lower than a third threshold.

16. The mobile terminal of claim 15, wherein the first threshold comprises 10 decibels (db) to 15 db, wherein the second threshold comprises 10 db to 15 db, and wherein the third threshold is 24 db to 28 db.

17. The mobile terminal of claim 15, wherein the first report comprises a B1 measurement report, and wherein the second report comprises a B2 measurement report.

18. The mobile terminal of claim 15, wherein the mobile terminal comprises a Voice over Long Term Evolution (VoLTE) mobile terminal.

19. The mobile terminal of claim 15, wherein the access control circuit comprises an access control module of an Internet Protocol (IP) multimedia subsystem.

20. The mobile terminal of claim 15, wherein the mobile terminal uses the call service by initiating a call or the mobile terminal receiving an incoming call.

* * * * *